June 2, 1953
J. C. CHILDS
2,640,892
ANTIGYRATION SELECTOR SWITCH
FOR ROTARY WING AIRCRAFT
Filed Oct. 21, 1948
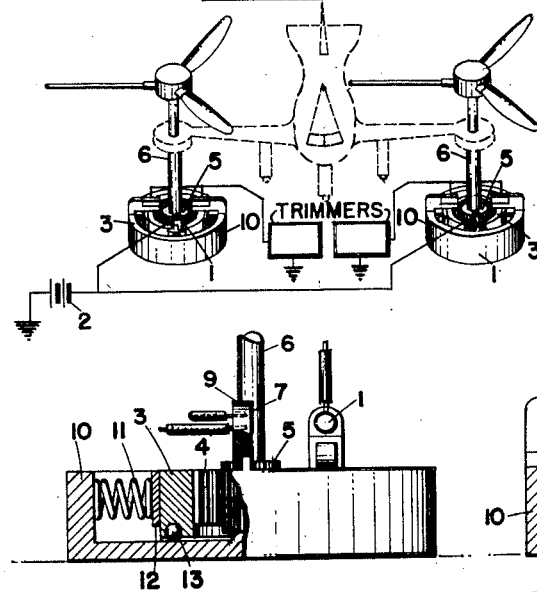
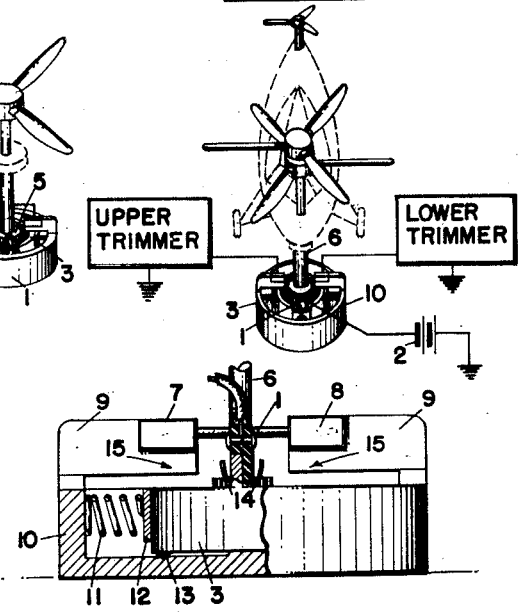
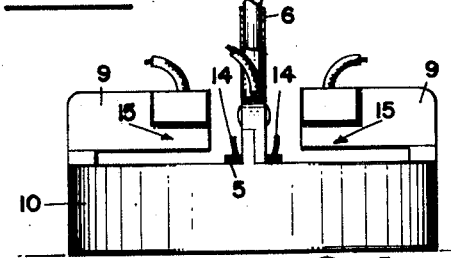
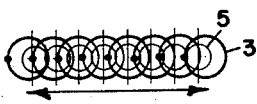
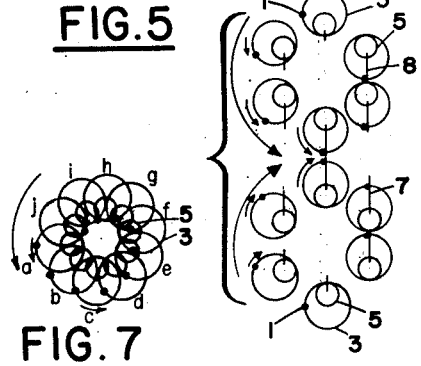
Inventor
JOHN C. CHILDS
By
Attorney Patented June 2, 1953

2,640,892

UNITED STATES PATENT OFFICE 2,640,892

ANTIGYRATION SELECTOR SWITCH FOR ROTARY WING AIRCRAFT

John C. Childs, New Rochelle, N. Y.

Application October 21, 1948, Serial No. 55,741

6 Claims. (Cl. 200—52)

(Granted under Title 35, U. S. Code (1952), sec. 266)

This invention relates to selector switch means for aircraft with two or more multi-bladed rotors where each rotor is equipped with automatic electrically operated rotor trimming means responsive to unbalance due to breakage of a rotor blade, for selecting and placing in operation only that trimming means which is on the damaged rotor. In my copending application, Serial No. 614,796, filed September 6, 1945, now Patent No. 2,576,105, dated November 27, 1951, eccentric switch devices for automatically trimming unbalanced rotating shafts were described, particularly as applied to damaged helicopter or other rotor shafts, to prevent further damage to the craft resulting from the ensuing gyrations. These devices operate satisfactorily in a craft having only one rotor. In a craft having more than one rotor, it is necessary to isolate all the rotors that are intact from the one that is unbalanced, so that only the switch device on the damaged rotor shaft will respond and set its balancing means into operation. Otherwise the devices on the shafts of the other rotors would be erroneously set into operation by the gyrations transmitted from the damaged rotor through the framework of the craft.

The object of the present invention is to prevent such erroneous operation of the above switch devices in multi-rotor craft, where one of the rotors is injured and sets up gyrations, by providing selector switch means responsive to the particular gyrations caused by that rotor to put into operation only its switch device.

Another object is to provide selector switch means axially aligned with each of the rotor shafts, which switch means will respond only to the unbalance of the corresponding rotor to place its balancing means in operation to the exclusion of the balancing means on the other rotor shafts.

Another object is to provide selector switch means as defined above wherein each of the switches is responsive only to circular gyrations in a direction corresponding to the direction of rotation of the corresponding rotor for closing the circuit of the corresponding automatic balancing means, thus isolating all other balancing means on rotors not axially alined with said switch and rotor, or not rotating in the same direction, as e. g. in oppositely rotating axially alined rotors.

Another object is to provide selector switch means operative exclusively in response to circular gyrations in only one direction.

Other and more specific objects will become apparent in the following detailed description of one illustrative form of selector switch made in accordance with the present invention, having reference to the accompanying drawing, wherein:

Fig. 1 is an outline of an aircraft with two laterally spaced rotors mounted on vertical shafts to which the switch means of the present invention are shown applied diagrammatically and out of proportion so as to illustrate the relation of the several parts, Fig. 2 is an outline of another arrangement of rotors with the switch means applied, Fig. 3 is a detail side view of one of the switches, partly in section, Fig. 4 is a front view thereof, Fig. 5 is a similar view of a switch applied to a double rotor shaft for oppositely rotating rotors, Fig. 6 diagrammatically illustrates the substantially reciprocating motion of the switch means of a rotor shaft displaced from the axis of the shaft of an unbalanced rotor shaft, Fig. 7 illustrates diagrammatically how the gyrations of a switch means caused by an unbalanced rotor on the same axis tend to rotate the ring member of the switch, and Fig. 8 illustrates diagrammatically how the gyrations of a switch means mounted on a double rotor shaft, as shown in Fig. 5, would cause the ring member to close the switch against one of the opposed contacts when one of the rotors is unbalanced, and against the other contact when the other rotor is unbalanced.

In the above referred to copending application, a trimming mechanism with a switch device was disclosed, for automatically balancing a damaged multi-bladed rotor in case of unbalance produced by damage to a rotor blade. The switch device operates in response to the gyrations caused by the unbalance, and controls the trimming mechanism to restore balance.

In multi-rotor craft, whether the rotors are mounted on spaced or concentric shafts, the application of these trimmer switch devices is not feasible without taking some precautionary measures to prevent the operation of the switch device and trimming mechanism on the wrong rotor, i. e. on a rotor that is not damaged and which is already in perfect balance, but which receives vibrations such as may be transmitted from a damaged rotor.

The present selector switch means prevents such erroneous operation by completing the circuit in only the switch device on the unbalanced rotor, when gyrations occur.

In the present disclosure, the selector switch means is described with reference to a twin or two-rotor craft, although it is applicable to other craft having more than two rotors. The switch means operates equally well with rotors mounted on concentric or on separately spaced shafts. It is assumed, however, that in the case of the concentric rotors, they are rotated in opposite directions.

The switch means comprises a contact 1, which may be connected to a source of electrical potential, such as the battery 2, the contact 1 being insulatably mounted on a ring member 3 having an internal gear 4. The ring member 3 is resiliently and rotatably held in concentric relation to an external gear 5 rigidly mounted on the frame of the craft, in coaxial alignment with a rotor shaft 6. A pair of radially extending contacts 7 and 8 are insulatably mounted on fixed brackets 9, in a position to be in the path of the contact 1 upon rotation of the ring member 3, and to maintain a sliding contact therewith upon radial displacement of said ring contact 1 in line with said contacts 7 or 8 respectively.

The resilient mounting of the ring member 3 may be provided by a fixed cup 10 formed concentrically around it and having a series of springs 11 circumferentially spaced therein with antifriction bearing members 12 resiliently pressing against the periphery of said ring member to normally hold it in concentric relation, while providing it with free rotation. Antifriction bearings 13 may also be provided between the ring member 3 and the bottom of the cup. The cup may be fixed to the outer gear 5, shaft 6, or the fuselage of the aircraft. It will be understood that Figs. 1 and 2 are diagrammatic and that the parts are shown in their general location on the aircraft and not in their detailed positions.

Reciprocating or oscillating vibrations in the frame of the craft will cause the ring member 3 to be displaced in a diametric direction relative to the rotor axis, as shown diagrammatically in Fig. 6. Gyrations or rotary vibrations of the frame, on the other hand, cause the ring member to swing around the fixed gear 5 and to creep around its own axis by meshing the gears as it swings around, as shown in Fig. 7. This creeping would normally continue in the absence of any obstructions, and in the present switch means it is taken advantage of to close contacts 1 and 7 or 1 and 8 depending on the direction of gyration.

Thus, this switch means, when positioned on a rotor axis will respond to gyrations due to an unbalance in that particular rotor, regardless of its direction of rotation, but will not operate to close the contacts in response to any reciprocations, such as would be caused by a rotor displaced from its axis. When applied to a twin rotor craft and connected as shown in Fig. 1, therefore, this switch means will act selectively to close the circuit of only the trimming switch device on the unbalanced rotor. The contacts 7 and 8 in this case are electrically connected together in each switch unit, so that it can be used on any rotor regardless of its direction of rotation. Each switch unit is connected in series in the trimming switch device of the corresponding rotor. When a rotor blade is damaged and the rotor sets up gyrations about its axis and that of the corresponding switch unit, this unit responds to complete the circuit of the trimming control switch on its rotor to restore its balance, but the other switch units are subject only to reciprocating or oscillating vibrations and will not respond but will remain open, keeping their trimming control circuits open. These other trimming control switch devices will therefore be ineffective to operate their trimming mechanisms in spite of any vibrations transmitted through the frame of the craft from the damaged rotor. Thus, in a multirotor craft, wherein the several rotors have spaced axes, a means may be provided to isolate trim control devices of all the undamaged rotors and prevent their erroneous operation in response to vibrations caused by the damaged rotor, and to bring into operation only the trim control device on the damaged rotor for properly restoring its balance.

In case of oppositely rotatable rotors on the same axis, the same selectivity as to isolating the undamaged rotor is obtained by using the switch unit as two switches, connecting the contacts 7 and 8 separately to the trim control switches on the two rotors, care being taken to connect the proper contact to the proper rotor switch, in accordance with the directions of rotation of the rotors, so that the contact in a clockwise direction from the creeping contact 1, will be connected to the trim control switch on the clockwise rotating rotor.

To assure separation of contact 1 from either contact 7 or contact 8, after balance has been restored and until another unbalance occurs, the ring members may be provided with light leaf springs 14 that come in contact with the supports 15 of contacts 7 and 8 just prior to the meeting of contact 1 with these contacts. These springs will resiliently hold the contacts separated except when acted on by the operation of the ring member in response to gyrations.

Obviously, these selective switch means may be made as sensitive as may be desired, although normally only gyrations due to major damages need be heeded, and high sensitivity would not be required for the specific purposes described above.

It is to be understood, however, that these selective switch means might be used in other circuits where rotary gyration, as distinguished from linear vibration, is desired to control some operations, especially where selective directional response is required.

Obvious modifications in the detail form of these switch means, as e. g. making the ring member rigid and the external gear resiliently floatable to react in a similar manner, may be made in accordance with the adaptations to which they may be put, without departing from the spirit and scope of this invention, as defined in the appended claims.

The invention described herein may be manufactured and used by or for the Government of the United States of America for governmental purposes without the payment of any royalties thereon or therefor.

What is claimed is:

1. Switching apparatus for operating trimmer means associated with a rotor mounted on a shaft in a rotary wing aircraft, said switching apparatus comprising a contact adapted to be fixedly mounted on said aircraft adjacent the shaft of said rotor, an annular ring adapted to surround said shaft, a second contact, said second contact being mounted on said annular ring, resilient substantially frictionless bearing means for supporting said annular ring for freely floatable and rotatable movement relative to said shaft, said annular ring being movable in a gyrational path in response to gyration of said rotor caused by an unbalanced condition in said rotor, said fixed contact being positioned so as to intercept said second contact during its travel in said gyrational path.

2. In a rotary wing aircraft having at least two rotors equipped with individual trimming means for rebalancing said rotors when an unbalanced condition exists therein, selective switch apparatus for each of the rotors comprising a supporting means adapted to be fixedly mounted on said aircraft adjacent said rotor, an annular ring, resilient bearing means mounted between said annular ring and said supporting means for floatably and rotatably mounting said annular ring with respect to said supporting means, a first contact connected to said supporting means, a second contact connected to said annular ring, said annular ring and said second contact, due to their floatable and rotatable mounting, following a gyrational path in response to gyration of said rotor, said first and second contacts being arranged on their respective members for contact with each other at a point in said gyrational path.

3. Switching apparatus for operating trimming means associated with a rotor mounted on a shaft in a rotary wing aircraft, said switching apparatus comprising a supporting means adapted to be fixedly mounted on said shaft, an annular ring adapted to have said shaft pass therethrough, resilient means mounted between said annular ring and said supporting means, said resilient bearing means mounting said annular ring for freely floating and rotating movement with respect to said shaft, first and second contacts mounted on said supporting means and annular ring, respectively, said freely floating and rotating mounting of said annular ring permitting said ring and the contact thereon to follow a gyrational path when the shaft, to which said supporting means is adapted to be connected, is subjected to gyration by an unbalanced rotor, said first contact being positioned on said supporting means in said path to intercept said second contact during said gyrational movement.

4. A switch for detecting gyrational movement of a rotatable shaft comprising an annular ring having an outer periphery providing a substantially frictionless surface, and having an inner periphery providing a friction surface, a fixed rotatable shaft having a friction surface adjacent to and concentric with the inner periphery of said annular ring, a fixed resilient and substantially frictionless bearing means for supporting said annular ring, a first contact mounted on said annular ring, a second contact fixedly mounted in the rotational path of said first contact, whereby a gyrational motion of said shaft will cause rotation of said annular ring and will cause said first and second contacts to close.

5. In a rotary wing aircraft having at least two rotors equipped with individual trimming means for rebalancing said rotors when an unbalanced condition exists therein selective switch apparatus for each of the rotors comprising a supporting means adapted to be fixedly mounted on said aircraft adjacent said rotor, an annular ring adapted to be mounted so as to receive the shaft of the rotor with the inner periphery of said ring being spaced from said shaft, an outer gear adapted to be mounted on said shaft, gear teeth mounted on said inner periphery of said ring, the teeth on said outer gear and said annular ring being arranged to mesh upon gyration of said ring, resilient means mounted between said annular ring and said supporting means for floatably and rotatably mounting said annular ring with respect to said supporting means, a first contact connected to said supporting means, a second connected to said annular ring, said annular ring and said second contact, due to their floatable and rotatable mounting, following a gyrational path in response to gyration of said rotor, said first and second contacts being arranged on their respective members for contact with each other at a point in said gyrational path.

6. Switching apparatus for operating trimming means associated with a rotor mounted on a shaft in a rotary wing aircraft, said switching apparatus comprising a supporting means adapted to be fixedly mounted on said shaft, an annular ring adapted to have said shaft pass therethrough, the inner periphery of said annular ring having a friction increasing surface thereon, and a friction increasing means mounted on said shaft, both said friction increasing means being adapted to engage each other upon gyrational movement upon said annular ring, resilient means mounted between said annular ring and said supporting means, said resilient means mounting said annular ring for freely floating and rotating movement with respect to said shaft, first and second contacts mounted on said supporting means and annular ring, respectively, said freely floating and rotating mounting of said annular ring permitting said ring and the contact thereon to follow a gyrational path when the shaft, to which said supporting means is adapted to be connected, is subjected to gyration by an unbalanced rotor, said first contact being positioned on said supporting means in said path to intercept said second contact during said gyrational movement.

JOHN C. CHILDS.

References Cited in the file of this patent

UNITED STATES PATENTS

| Number | Name | Date |
|---|---|---|
| 916,649 | Backe | Mar. 30, 1909 |
| 941,556 | Brainard | Nov. 30, 1909 |
| 1,214,309 | Jillson | Jan. 30, 1917 |
| 2,076,090 | Myers | Apr. 6, 1937 |
| 2,422,973 | Martin | June 24, 1947 |